(12) United States Patent
Inaba et al.

(10) Patent No.: US 7,098,272 B2
(45) Date of Patent: Aug. 29, 2006

(54) METHOD FOR PRODUCING HYDROXYL GROUP-CONTAINING POLYMER PARTICLES

(75) Inventors: Yoshihiro Inaba, Minamiashigara (JP); Takako Kobayashi, Minamiashigara (JP); Chisato Urano, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 325 days.

(21) Appl. No.: 10/784,183

(22) Filed: Feb. 24, 2004

(65) Prior Publication Data

US 2005/0009996 A1   Jan. 13, 2005

(30) Foreign Application Priority Data

Jul. 10, 2003 (JP) ............................. 2003-194978

(51) Int. Cl.
*C08F 8/32* (2006.01)
(52) U.S. Cl. .............................. 525/330.5; 525/330.6; 525/380; 525/384
(58) Field of Classification Search ............ 525/330.5, 525/330.6, 380, 384
See application file for complete search history.

(56) References Cited

U.S. PATENT DOCUMENTS

| | | | | |
|---|---|---|---|---|
| 2,109,877 A | * | 3/1938 | Barrett ..................... | 525/330.6 |
| 2,938,887 A | * | 5/1960 | Weiss ....................... | 525/332.3 |
| 5,051,480 A | * | 9/1991 | Coran ....................... | 525/227 |
| 5,466,756 A | * | 11/1995 | Roach et al. ............. | 525/330.6 |
| 5,656,692 A | * | 8/1997 | Hayes ....................... | 525/63 |
| 5,763,546 A | * | 6/1998 | Jung et al. ............... | 526/87 |

FOREIGN PATENT DOCUMENTS

| | | |
|---|---|---|
| JP | A 60-96605 | 5/1985 |
| JP | B 61-36177 | 8/1986 |
| JP | B 2-19902 | 5/1990 |
| JP | A 5-1106 | 1/1993 |

* cited by examiner

*Primary Examiner*—Bernard Lipman
(74) *Attorney, Agent, or Firm*—Oliff & Berridge, PLC

(57) ABSTRACT

The present invention provides a method for producing hydroxyl group-containing polymer particles including causing cross-linked polymer particles containing a (meth) acrylate polymer to react in the presence of a metal-containing ester-exchange reaction catalyst with at least one compound selected from the group consisting of a compound including at least two hydroxyl groups and a compound including at least one primary amino group and at least one hydroxyl group, the cross-linked polymer particles comprising the (meth)acrylate polymer represented by the following formula (I):

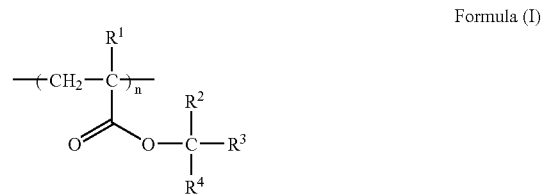

Formula (I)

wherein $R^1$ represents a hydrogen atom or a methyl group; $R^2$ to $R^4$ may be the same or different from each other, and each independently represents a substituted or non-substituted alkyl group or a substituted or non-substituted aryl group, any one of which has 1 to 12 carbon atoms; and n represents an integer of 1 or more.

9 Claims, No Drawings

METHOD FOR PRODUCING HYDROXYL GROUP-CONTAINING POLYMER PARTICLES

CROSS-REFERENCES TO RELATED APPLICATIONS

This application claims benefit of and priority to Japanese Patent Application No. 2003-194978, filed on Jul. 10, 2003, which is incorporated herein by reference in its entirety for all purposes.

BACKGROUND OF THE INVENTION

1. Field of the Invention

The present invention relates to a method for producing cross-linked polymer particles containing hydroxyl groups that can be applied to good effect in fields such as carriers of diagnostic agents and pharmaceuticals, carriers for chromatography, viscosity-controlling agents, resin-molding materials, paint additives, cross-linking/hardening agents and additives for cosmetics.

2. Description of the Related Art

Conventionally two methods have been used for producing polymer particles containing hydroxyl groups. According to the first method, polymer particles are initially formed by suspension-polymerization of monomers containing functional groups that can be converted into hydroxyl groups in an aqueous medium, and the functional groups are then converted into hydroxyl groups. According to the second method, cross-linked polymer particles containing reactive functional groups are formed, and the hydroxyl groups are then introduced into the particles by causing a hydroxyl group-containing compound to react with the reactive functional groups and thus to be linked to the particles.

Examples known in the art of polymer particles produced by the first method include porous and spherical separation carriers obtained either by homo-polymerization of an aqueous suspension of pentaerythritol dimethacrylate, or by aqueous co-polymerization of pentaerythritol dimethacrylate with a methacrylate monomer containing hydrophilic groups and/or groups that can be converted into hydrophilic groups (for example, see Japanese Patent Application Publication (JP-B) No. 61-36177). However, since pentaerythritol dimethacrylate is not industrially manufactured on a large scale, users first need to manufacture pentaerythritol and thus the process becomes complicated.

In a variation of the first method disclosed, ester groups of a co-polymer obtained by co-polymerization of carboxylic acid vinyl ester monomers and cross-linking monomers containing isocyanulate rings are converted into hydroxyl groups by saponification (for example, see JP-B No. 2-19902). However, the hydroxyl group obtained by saponification of the carboxylic acid vinyl ester is restricted to a polyvinyl alcohol-type hydroxyl group directly linked to the main chain, and a drawback of this method is that chemical structures surrounding the hydroxyl group cannot be modified. In addition, since carboxylic acid salts cannot easily be removed from the inside of the particles after alkali-hydrolysis, the process used by following this method has also tended to become complicated.

As the second method disclosed for producing the hydrophilic separation carrier containing the hydroxyl groups, a cross-linked co-polymer of (meth)acrylic acid ester containing glycidyl groups is made to perform a ring-opening reaction with polyethyleneglycol or glycerin (Japanese Patent Application Laid-open (JP-A) No. 60-96605). However, since a reactive functional group such as the glycidyl group tends to cause side reactions, and it becomes difficult to control the amount of the hydroxyl group, the properties of the desired particles have tended to be adversely affected. Furthermore, (meth)acrylic ester containing a glycidyl group is toxic and its use is not desirable in terms of safety or hygiene.

In a variation of the second method disclosed, fine particles of a cross-linked polymer containing reactive functional groups, selected from an epoxy group (such as the glycidyl group), an hydroxyl group and a carboxylic group are made to react with a polyethyleneglycol (Japanese Patent Application Laid-Open (JP-A) No. 5-1106). However, control of the amount of the hydroxyl group and control of particle properties as the object of the method are difficult, insofar that in this production method the hydroxyl group originating from polyethyleneglycol, and the hydroxyl group and carboxylic group inherent in the particles tend to become mixed together. Moreover, use of an epoxy group (such as the glycidyl group) also entails the same problems as with the use of a glycidyl group.

Conventional production methods for obtaining hydroxyl group-containing polymer particles have thus so far entailed the problems described above.

SUMMARY OF THE INVENTION

Accordingly, the present invention provides a method for producing hydroxyl group-containing polymer particles without recourse to special starting materials and monomers containing reactive functional groups used in the conventional method for producing the hydroxyl group-containing particles. This method is inexpensive and safe, does not require complicated procedures, the amount of the hydroxyl group is readily controlled and there is no residue of functional groups that adversely affect the properties.

The invention provides a method for producing hydroxyl group-containing polymer particles comprising:

causing cross-linked polymer particles comprising a (meth)acrylate polymer to react in the presence of a metal-containing ester-exchange reaction catalyst with at least one compound selected from the group consisting of a compound including at least two hydroxyl groups and a compound including at least one primary amino group and at least one hydroxyl group, the cross-linked polymer particles comprising the (meth)acrylate polymer represented by the following formula (I):

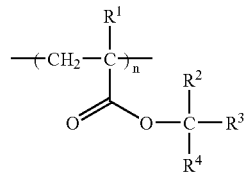

Formula (I)

wherein $R^1$ represents a hydrogen atom or a methyl group; $R^2$ to $R^4$ may be the same or different from each other, and each independently represents a substituted or non-substituted alkyl group or a substituted or non-substituted aryl group, any one of which has 1 to 12 carbon atoms; and n represents an integer of 1 or more.

DETAILED DESCRIPTION OF THE INVENTION

The method for producing hydroxyl group-containing polymer particles of the present invention includes allowing cross-linked polymer particles containing a (meth)acrylate polymer to react, in the presence of a metal-containing ester-exchange reaction catalyst, with at least one compound selected from the group consisting of a compound including at least two hydroxyl groups and a compound including at least one primary amino group and at least one hydroxyl group.

The term "(meth)acrylate" as used herein has its usual meaning, and can mean "an acrylic acid ester" or "a methacrylic acid ester".

The production method of the invention provides the hydroxyl group-containing polymer particles without recourse to special starting materials and monomers containing reactive functional groups used in the conventional method for producing hydroxyl group-containing particles. This method is inexpensive and safe, does not entail complicated procedures, the amount of the hydroxyl group is readily controlled and there is no residue of functional groups that adversely affect the properties of the particles.

The invention will be described hereinafter in more detail.

Cross-Linked Polymer Particles

The cross-linked polymer particles used in the invention include the (meth)acrylate polymer represented by the formula (I) below as a principal constituent:

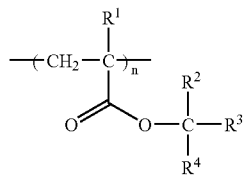

Formula (I)

In the formula (I), $R^1$ represents a hydrogen atom or a methyl group; $R^2$ to $R^4$ may be the same or different from each other, and each independently represents a substituted or non-substituted alkyl group, or a substituted or non-substituted aryl group, any one of which has 1 to 12 carbon atoms; and n represents an integer of 1 or more.

The $R^2$ to $R^4$ alkyl groups in the (meth)acrylate polymer represented by the formula (I) are alkyl groups having 1 to 12 carbon atoms that may be either substituted or non-substituted. Examples of such groups include methyl, ethyl, n-propyl, isopropyl, n-butyl, t-butyl, pentyl, isopentyl, neopentyl, hexyl, heptyl, n-octyl, nonyl, decyl, undecyl, dodecyl and benzyl groups, among which the methyl, ethyl, propyl and benzyl groups are preferable while the methyl group is more preferable.

The aryl groups are aryl groups having 1 to 12 carbon atoms that may be either substituted or non-substituted. While examples of them include phenyl, naphthyl, tolyl and p-n-octyloxyphenyl groups, the phenyl group is preferable. n represents an integer of 1 or more.

Examples of substituents include alkyl groups, alkoxy groups, halogen atoms and aryl groups.

The alkyl group has the same meaning as the alkyl group representing $R^2$ to $R^4$.

Examples of the alkoxy group include methoxy, ethoxy, propoxy and butoxy groups, and the methoxy and ethoxy groups are preferable.

While examples of halogen atoms include fluorine, chlorine, bromine and iodine atoms, the fluorine and chlorine atoms are preferable.

The aryl group has the same meaning as the aryl group representing $R^2$ to $R^4$.

Examples of the (meth)acrylate polymer represented by formula (I) include polymers of monomers such as t-butyl (meth)acrylate, 1,1-dimethylpropyl(meth)acrylate, 1,1,2-trimethylpropyl(meth)acrylate, 1,1-diethylpropyl(meth)acrylate, 1,1-dimethylhexyl(meth)acrylate and 1-methyl-1-phenylethyl(meth)acrylate. Among these polymers the t-butyl(meth)acrylate polymer is preferable, considering the availability, price and reactivity of its monomer.

Specifically, the cross-linked polymer of the invention is obtained by co-polymerization of the monomers described above with cross-linking monomers such as divinylbenzene, ethyleneglycol di(meth)acrylate, diethyleneglycol di(meth)acrylate, glycidyl (meth)acrylate and 2-[(1'-methylpropylideneamino)carboxyamino]ethyl(meth)acrylate. The polymer may be cross-linked during the polymerization process, or may be cross-linked after granulating the polymer by polymerization.

In addition to the polymer components of the monomers described above, the cross-linked polymer particles can be obtained by co-polymerization with other monomers. A monomer having no ester-exchange ability, or having a weak ester-exchange ability if any, is caused to co-polymerize with the above monomer, and the content of the hydroxyl group can be controlled by changing the proportion of both kinds of monomers. Examples of other monomers suitable for this purpose are styrene and methyl(meth)acrylate.

Additives known in the art such as dyes, pigments, carbon blacks and magnetic powder may be added to the cross-linked polymer particles for coloring.

The polymer can be formed as porous particles by adding to the monomer a non-polymerizable additive such as toluene, octane, cyclohexanone, dibutyl phthalate or lauryl alcohol, and then, after polymerization, removing the additive by extraction.

The hydroxyl group-containing polymer particles of the invention do not react with the additives and solvents, and because the polymer particles have no special reactive functional groups, properties of the particles are accordingly not adversely affected, or at least very rarely affected, by residual additives and solvents.

Compound Including Two Hydroxyl Groups

Compounds of the invention including two hydroxyl groups have at least two hydroxyl groups in one molecule. Any compound can be used as long as it has two or more hydroxyl groups in one molecule.

Specific examples of such compounds include the so-called alcohol compounds such as ethyleneglycol, diethyleneglycol, polyethyleneglycol, polypropyleneglycol, polytetramethyleneglycol, butanediol, hexanediol, glycerin, polyglycerin, p-xylene-α,α-diol, 1,4-cyclohexanedimethanol, p-hydroxyphenylethanol, 2,2'-iminodiethanol, N-methyldimethanolamine, 2-hydroxyethyl disulfide, 2,2'-thiodiethanol, 2,2',2''-nitrilotriethanol, 1,1,1-tris(hydroxymethyl) ethane, 1,1,1-tris(hydroxymethyl)propane, and 2,2-bis(hydroxymethyl)-2,2',2''-nitrilotriethanol.

Compounds Containing at Least One Primary Amino Group and at Least One Hydroxyl Group Compounds including at least one primary amino group and at least one hydroxyl group include in the molecule, in addition to the hydroxyl groups, one or more amino groups and at least one of the amino groups is a primary amino group. Specific examples of the compound include the so-called amino-alcohol compounds such as aminoethanol, 3-amino-1-propanol, N-aminoethylethanolamine, 3-amino-1,2-propanediol, 2-amino-2-methyl-1,3-propanediol, 2-(2-aminoethoxy)ethanol, N-aminoethanolamine, 2-amino-2-hydroxymethyl-1,3-propanediol, aminobenzylalcohol, aminophenethylalcohol and aminophenol.

The hydroxyl group-containing polymer particles are obtained in the invention by causing one of the hydroxyl groups of the compound including at least two hydroxyl groups or the hydroxyl and/or the amino group of the compound including at least one primary amino group and at least one hydroxyl group, for example the hydroxyl group and/or amino group of the alcohol compound or aminoalcohol compound, to be linked to the cross-linked polymer particles by ester-exchange between the ester moiety of the (meth)acrylate polymer, while the hydroxyl group at the other end is left unreacted. While, in order to proceed smoothly the above ester-exchange, it is preferable to cause to react with the cross-linked polymer particles a molar ratio of the alcohol compound or aminoalcohol compound equivalent to the total mole of the functional groups contained in the cross-linked polymer particles, or higher, since in practice all the functional groups in the polymer particles are not invariably involved in the ester-exchange reaction, the proportion of the compound may be the equivalent molar ratio or less.

Further, the content of the hydroxyl group can be controlled by controlling the amount of the alcohol compound, or of the aminoalcohol compound, used.

Metal-Containing Ester-Exchange Reaction Catalyst

A so-called ester-exchange catalyst used for synthesizing polyester may be favorably used for the metal-containing ester-exchange reaction catalyst added in the invention.

Examples of the metal-containing catalyst include typical metal compounds such as lead acetate, zinc acetate, zinc acetylacetonate, cadmium acetate, manganese acetate, manganese acetylacetonate, cobalt acetate, cobalt acetylacetonate, nickel acetate, nickel acetylacetonate, zirconium acetate, zirconium acetylacetonate, zirconium tetra-n-butoxide, titanium acetate, tetrabutoxytitanate, tetraisopropoxytitanate, titanium oxyacetylacetonate, iron acetate, iron acetylacetonate, transition metal compounds such as niobium acetate, dibutyltin oxide, monobutylhydroxytin oxide, zibutyltin dilaurate, antimony trioxide, germanium oxide, bismuth carbonate oxide and bismuth acetate oxide.

Other metal-containing catalysts available include alkalimetal compounds or alkaline-earth metal compounds such as magnesium acetate, lithium acetate, calcium acetate, potassium acetate, potassium carbonate and cesium carbonate, as well as rare earth compounds such as lanthanum acetate, samarium acetate, europium acetate, erbium acetate and ytterbium acetate.

These catalysts may be used alone, or in combination of two or more. In view of its solubility in solvents and its reactivity, titanium tetraalkoxide is more preferable among these catalysts. Examples of titanium tetraalkoxide include tetra-n-propoxy titanium, tetraisopropoxy titanium, tetra-n-butoxy titanium, tetraisobutoxy titanium, tetra-t-butoxy titanium, tetra-sec-butoxy titanium, tetra-n-amyloxy titanium and triisoamyloxyisopropoxy titanium.

The amount of catalyst (content) added relative to the cross-linked polymer particles is usually 0.01 to 50 parts by mass, preferably 0.1 to 20 parts by mass and more preferably 0.5 to 10 parts by mass, relative to 100 parts by mass of the total weight of the particles.

maintaining the content of the catalyst with the range of 0.01 to 50 parts by mass enables the hydroxyl group to be readily introduced, thus permiting the catalyst to be advantageously removed after the reaction.

Examples of methods known in the art, which may be favorably used for obtaining the cross-linked polymer particles, include a suspension-polymerization method, an emulsion-polymerization method, a dispersion-polymerization method and a seed-polymerization method. The suspension-polymerization method may also include a emulsification method known as a film emulsion method.

Polymerization-initiating catalysts known to those skilled in the art may, whenever necessary, be used for polymerization.

Examples of the catalyst include organic peroxides such as diacyl peroxide, ketone peroxide and alkylhydroperoxide; inorganic peroxides such as hydrogen peroxide and ozone; oil-soluble organic azo compounds such as azobisvaleronitrile (AIBN) (trade name: V-60, manufactured by Wako Pure Chemical Industries, Ltd.), 2,2'-azobis(2-methylbutyronitrile) (trade name: V-59, manufactured by Wako Pure Chemical Industries, Ltd.) and 2,2-azobis(2,4-dimethylvaleronitrile) (trade name: V-65, manufactured by Wako Pure Chemical Industries, Ltd.); and water-soluble organic azo compounds such as 2,2'-azobis(2-aminopropane) dihydrochloride (trade name: V-50, manufactured by Wako Pure Chemical Industries, Ltd.), 2,2'-azobis[2-methyl-N-(2-hydroxyethyl)propionamide] (trade name: VA-086, manufactured by Wako Pure Chemical Industries, Ltd.), and 2,2'-azobis[2-(2-imidazoline-2-yl)propane] dihydrochloride (trade name: VA-044, manufactured by Wako Pure Chemical Industries, Ltd.). When it is used the initiator is used in a quantity sufficient for favorably initiating the polymerization. The appropriate quantity is well known to those skilled in the art. Usually, the preferable quantity used is 0.1 to 5.0% by mass.

For accelerating the reaction when the cross-linked polymer particles are highly cross-linked, it is preferable to add a non-reactive solvent that is able to swell the polymer particles as an auxiliary solvent. While examples of the auxiliary solvent include aromatic compounds such as xylene, mesitylene, diethylbenzene, cyclohexylbenzene, dimethylnaphthalene, cymene and dimethoxybenzene; ether compounds such as diethyleneglycol dimethylether, diethyleneglycol dibutylether, diphenylether, dibenzylether, phenetole and butylphenylether; ketone compounds such as acetophenone, isophorone, diisobutylketone, cyclohexanone and methyl cyclohexanone; and halogen compounds such as dichlorobenzene, chlorotoluene and dichlorotoluene, any available solvents may be used so long as they are non-reactive solvents that can attain the above object. Among such non-reactive solvents, aromatic compounds such as xylene, mesitylene and dimethoxybenzene are preferable, in view of their reactivity.

While in the invention, the degree of reaction between the cross-linked polymer particles and at least one of the compounds selected from the alcohol compounds and the aminoalcohol compounds varies depending on the combination of the ester moiety of the cross-linked polymer particles and the amount of the functional groups introduced, the alcohol compounds and aminoalcohol compounds are basically used in a proportion of twice to 10 times as high as the amount of the cross-linked polymer particles. Whenever necessary the hydroxyl group-containing cross-linked polymer particles may be obtained by causing the cross-linked polymer particles to react with the above compounds under a reaction condition of 120° C. to 200° C., and of 5 to 24 hours' heating in a non-reactive solvent. The amount of the hydroxyl group may be readily controlled by controlling the amount of such reagents added.

Considering the reproducibility of the amount of the hydroxyl group introduced, it is desirable to classify the particles before the reaction in order to make the particle diameter uniform. The hydroxyl group-containing cross-linked polymer particles thus obtained are diluted by dispersing in a solvent such as methanol, filtered, and washed with water and/or a solvent. The particles can be isolated as a powder by usual means such as spray-drying, drying under a reduced pressure, and freeze-drying.

While the reaction can be undertaken not only under an atmospheric pressure but also under a high pressure, reaction conditions are not particularly restricted since they may be appropriately adjusted depending on the requirements.

The amount of the hydroxyl group in the hydroxyl group-containing cross-linked polymer particles obtained by the above procedure can be determined by a common titration method.

For example, a given quantity of cross-linked polymer is added in a reagent solution such as a pyridine solution of acetic anhydride, and the polymer is hydrolyzed by adding water during heating. The supernatant of the reaction solution is separated from the particle by centrifugation. The amount of the hydroxyl group is determined by titration of the supernatant with an ethanolic potassium hydroxide solution using an indicator such as phenolphthalein.

The hydroxyl group-containing cross-linked polymer particles obtained by the manufacturing method of the invention can be favorably used in many fields of application such as carriers of diagnostic reagents and medicines, carriers for chromatography, viscosity-controlling agents, resin-molding materials, paint additives, cross-linking/hardening agents and additives of cosmetics.

EXAMPLES

While the present invention is described in more detail hereinafter with reference to examples, the invention is by no means restricted to these examples. "Parts" in the examples denote "parts by mass".

Reference Example 1

Synthesis of Cross-Linked Polymer Particles t-Butyl methacrylate (100 parts, manufactured by Wako Pure Chemical Industries, Ltd.) are subjected to suspension-polymerization with 5 parts of divinylbenzene (purity: 55%), and cross-linked polymer particles with an average particle diameter of 15 µm are obtained after classification. The particles thus obtained are washed with ion-exchange water and a solvent, isolated and dried to obtain the cross-linked polymer particles.

Reference Example 2

Synthesis of Cross-Linked Polymer Particles for Comparison

Methyl methacrylate (70 parts, manufactured by Tokyo Kasei Kogyo Co., Ltd.) is subjected to suspension-polymerization with 5 parts of divinylbenzene (purity: 55%), and cross-linked polymer particles with an average particle diameter of 15 µm are obtained after classification. The particles thus obtained are washed with ion-exchange water and a solvent, isolated and dried to obtain the cross-linked polymer particles.

Example 1

The cross-linked polymer particles (10 parts) obtained in Reference Example 1 are dispersed in 50 parts of polyethyleneglycol 200 (manufactured by Wako Pure Chemical Industries, Ltd.), and 15 parts of mesitylene (manufactured by Wako Pure Chemical Industries, Ltd.) is added to the dispersion solution. The mixture is allowed to react under a nitrogen atmosphere with reflux for 14 hours while 0.2 parts of tetra-n-propoxytitanium is added in drips.

The particles obtained are dispersed/washed in methanol and washed with ion-exchange water and a solvent, isolated and dried to obtain the hydroxyl group-containing polymer particles.

The amount of the hydroxyl group of the hydroxyl group-containing polymer particles thus obtained is determined by the following method.

The particles are weighed in a test tube with a cap, and a given quantity of a previously prepared pyridine (manufactured by Wako Pure Chemical Industries, Ltd.) solution of acetic anhydride (manufactured by Wako Pure Chemical Industries, Ltd.) is added into the test tube. The test tube was heated at 95° C. for 24 hours.

Acetic anhydride in the test tube is hydrolyzed by adding distilled water, and the particles are separated from the supernatant by centrifugation at 3,000 rpm for 5 minutes. The particles are washed by repeating ultrasonic dispersion and centrifugation in ethanol (manufactured by Wako Pure Chemical Industries, Ltd.). The supernatant and washing solution are collected in a conical beaker, and the combined solution is titrated with a 0.1 M ethanolic potassium hydroxide solution (manufactured by Wako Pure Chemical Industries, Ltd.) using phenolphthalein (manufactured by Wako Pure Chemical Industries, Ltd.) as an indicator.

A blank experiment was also performed without using the particles, and the amount of the hydroxyl group (A mmol/g) is calculated from the difference in measured values between the sample measurement and the blank experiment:

$$A=[(B-C)\times 0.1 \times f]/w$$

where B denotes the titration volume (ml) in the blank experiment, C denotes the titration volume (ml) in the sample measurement, f denotes a factor of the potassium hydroxide solution, and w denotes the weight (g) of the particles.

The amount of the hydroxyl group of the hydroxyl group-containing polymer particles in this example is found to be 1.6 mmol/g.

Example 2

The cross-linked polymer particles (10 parts) obtained in Reference Example 1 are dispersed in 50 parts of p-xylene-α,α-diol, and 0.2 parts of tetra-n-propoxytitanium is added to the dispersion solution under a nitrogen atmosphere. The mixture is allowed to react at 170° C. for 14 hours. The particles obtained are dispersed/washed in methanol and washed with ion-exchange water and a solvent, isolated and dried to obtain the hydroxyl group-containing polymer particles. The amount of the hydroxyl group of the hydroxyl group-containing polymer particles thus obtained is determined by the same method as in Example 1, and the amount of the hydroxyl group is found to be 2.4 mmol/g.

Comparative Example 1

The particles of the comparative example are obtained by exactly the same method as in Example 1 except insofar that no catalyst was added.

The same method of measurement is used as in Example 1. No hydroxyl group whatsoever is detected in the particles.

Comparative Example 2

The particles of the comparative example are obtained by the same method as in Example 1 except in respect of the use of the cross-linked polymer particles obtained in Reference Example 2

The same method of measurement is used as in Example 1. No hydroxyl group whatsoever is detected in the particles.

The invention provides a method for producing particles of a hydroxyl group-containing polymer without recourse to special starting materials and monomers containing reactive functional groups used in the conventional method for producing hydroxyl group-containing, particles. This method is inexpensive and safe, does not entail complicated procedures, the amount of the hydroxyl group is readily controlled and there is no residue of functional groups that adversely affect the properties of the particles.

What is claimed is:

1. A method for producing hydroxyl group-containing polymer particles comprising:
   causing cross-linked polymer particles comprising a (meth)acrylate polymer to react in the presence of a metal-containing ester-exchange reaction catalyst with at least one compound selected from the group consisting of a compound including at least two hydroxyl groups and a compound including at least one primary amino group and at least one hydroxyl group,
   the cross-linked polymer particles comprising the (meth)acrylate polymer represented by the following formula (I):

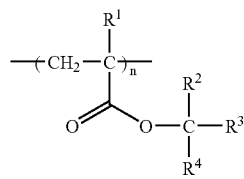

Formula (I)

wherein $R^1$ represents a hydrogen atom or a methyl group; $R^2$ to $R^4$ may be the same or different from each other, and each independently represents a substituted or non-substituted alkyl group or a substituted or non-substituted aryl group, any one of which has 1 to 12 carbon atoms; and n represents an integer of 1 or more.

2. A method according to claim 1, wherein in the reaction, a non-reactive solvent capable of swelling the cross-linked polymer particles comprising the (meth)acrylate polymer represented by the formula (I) is used.

3. A method according to claim 1, wherein at least one of $R^2$ to $R^4$ in the formula (I) each independently represents an alkyl group selected from the group consisting of substituted or non-substituted methyl, ethyl, propyl and benzyl groups.

4. A method according to claim 1, wherein at least one of $R^2$ to $R^4$ in the formula (I) each independently represents an aryl group selected from the group consisting of substituted or non-substituted phenyl, naphthyl, tolyl and p-n-octyloxyphenyl groups.

5. A method according to claim 1, wherein the (meth)acrylate polymer represented by the formula (I) is a t-butyl (meth)acrylate polymer, and the metal-containing ester-exchange reaction catalyst is titanium tetraalkoxide.

6. A method according to claim 2, wherein the (meth)acrylate polymer represented by the formula (I) is a t-butyl (meth)acrylate polymer, and the metal-containing ester-exchange reaction catalyst is titanium tetraalkoxide.

7. A method according to claim 1, wherein, in the reaction, the cross-linked polymer particles comprising the (meth)acrylate polymer are caused to react with a compound including at least two hydroxyl groups, and the compound including at least two hydroxyl groups is an alcohol compound.

8. A method according to claim 1, wherein, in the reaction, the cross-linked polymer particles comprising the (meth)acrylate polymer are caused to react with a compound including at least one primary amino group and at least one hydroxyl group, and the compound including at least one primary amino group and at least one hydroxyl group is an aminoalcohol compound.

9. A method according to claim 1, wherein the metal-containing ester-exchange reaction catalyst is titanium tetraalkoxide.

* * * * *